United States Patent
Raikov et al.

(10) Patent No.: US 10,628,148 B1
(45) Date of Patent: Apr. 21, 2020

(54) RESOURCE DEPLOYMENT FOR INTER-PLATFORM APPLICATION MANAGER

(71) Applicant: VMware, Inc., Palo Alto, CA (US)

(72) Inventors: Ventsyslav Raikov, Sofia (BG); Zahari Ivanov, Sofia (BG); Anna Delcheva, Sofia (BG)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/198,633

(22) Filed: Nov. 21, 2018

(51) Int. Cl.
| | | |
|---|---|---|
| *G06F 8/61* | (2018.01) | |
| *G06F 8/60* | (2018.01) | |
| *H04L 29/08* | (2006.01) | |
| *G06F 9/455* | (2018.01) | |

(52) U.S. Cl.
CPC .......... *G06F 8/63* (2013.01); *G06F 8/60* (2013.01); *G06F 8/61* (2013.01); *G06F 9/45533* (2013.01); *H04L 67/10* (2013.01)

(58) Field of Classification Search
CPC ............... G06F 8/61; G06F 8/60; G06F 8/63
See application file for complete search history.

(56) References Cited

U.S. PATENT DOCUMENTS

| | | | |
|---|---|---|---|
| 8,037,187 B2 | 10/2011 | Dawson et al. | |
| 8,271,653 B2 | 9/2012 | DeHaan | |
| 9,026,658 B2 * | 5/2015 | Xu | G06F 9/5027 709/202 |
| 9,319,286 B2 | 4/2016 | Panuganty | |
| 9,935,825 B2 * | 4/2018 | Aswathanarayana | H04L 41/0806 |
| 2013/0138812 A1 * | 5/2013 | Assuncao | G06F 9/50 709/226 |
| 2013/0191542 A1 | 7/2013 | Matczynski et al. | |
| 2013/0238805 A1 * | 9/2013 | Catrein | H04L 47/70 709/226 |
| 2015/0007046 A1 * | 1/2015 | Branson | H04L 67/1025 715/748 |
| 2015/0163288 A1 * | 6/2015 | Maes | H04L 67/10 709/203 |
| 2015/0180949 A1 * | 6/2015 | Maes | H04L 43/10 709/201 |
| 2017/0351716 A1 * | 12/2017 | Higginson | G06F 16/9535 |

OTHER PUBLICATIONS

Buyya et al., "Multi-Cloud Resource Provisioning with Aneka: A Unified and Integrated Utilisation of Microsoft Azure and Amazon EC2 Instances" (Year: 2015).*
Munteanu et al., "Multi-cloud resource management: cloud service interfacing" (Year: 2014).*

* cited by examiner

*Primary Examiner* — Phillip H Nguyen

(57) ABSTRACT

An inter-platform application manager may require a platform-specific resource template to be mapped to a resource proxy before it can be deployed to the platform. The mapping requirement can prove incompatible to automation software requiring a stateless API and may also limit accessibility by some human users. A front end can be provided that automates mapping (or provides for administrator mapping) of templates to proxies. Only mapped resources are made available to a user for selection. Accordingly, user-selected resource can then be deployed without risk of interruption due to a lack of mapping. The front end can provide a RESTful API so as to be compatible with conforming automation programs.

13 Claims, 2 Drawing Sheets

RESOURCE DEPLOYMENT FOR INTER-PLATFORM APPLICATION MANAGER

BACKGROUND

Enterprises may distribute their applications between platforms, e.g., between cloud and on-premises systems and/or between cloud providers. Using the cloud minimizes the burden of maintaining infrastructure, while on-premises systems may offer greater security and may be required for compliance with laws and regulations regarding customer privacy. Different cloud services may be engaged to take advantage of differing feature sets and to provide for cost-minimization as pricing plans vary over time.

DETAILED DESCRIPTION

Figure 1:
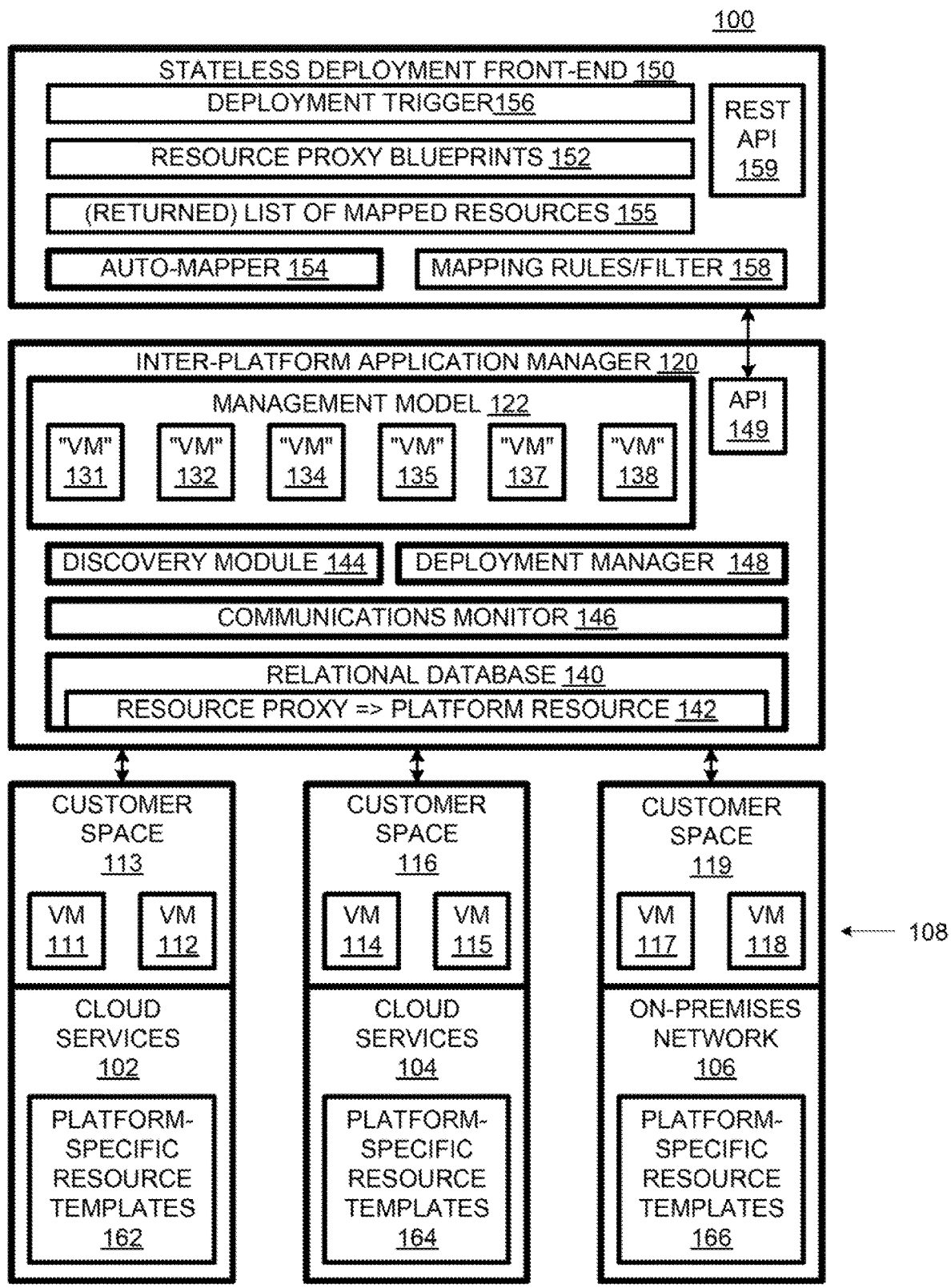
FIG. 1 is a schematic diagram of an inter-platform application system.

The present invention facilitates deployment of compute resources in a multi-platform environment by auto-mapping resource proxies to platform-specific templates (aka "images"). Herein, "multi-platform" encompasses "multi-cloud" and "hybrid cloud". Many enterprises distribute their mission applications among plural platforms. For example, on-premises systems may be used for more complete control and security, while cloud services can be used to relieve the enterprise of having to manage hardware. Different cloud services, e.g., Amazon Web Services (AWS) and Microsoft Azure, may be used due to differing feature sets and price structures. Different accounts within a cloud service may be used, e.g., by different departments within an enterprise.

An inter-platform application manager can assist an enterprise in managing its multi-platform application environment. For example, virtual machines distributed across platforms may be represented by respective management abstractions, referred to herein as "proxies", which can be displayed together in an integrated management model. Communications patterns between virtual machines can be represented in the integrated view to identify security risks and to suggest candidates for consolidation (e.g., moving virtual machines that frequently communicate with each other to a common platform).

An inter-platform application manager can include a discovery module that performs an inventory check on each platform, the results of which are used to populate the management model. Applications and other resources can be added directly using the platform interfaces, and the management model can be updated through discovery. However, to make the multi-platform environment accessible to a greater range of users, the inter-platform application manager can allow a resource proxy to be defined first for the management model followed by a deployment of the corresponding application, virtual machine or other resource on the managed platforms. However, before the resource can be deployed, it must be mapped to the proxy, e.g., associated with a name for the proxy in a database of the inter-platform application manager.

While mapping a proxy to a platform-specific resource is not particularly difficult, it can present an unwanted additional complexity to a user that wants to deploy a resource. Herein, "user" encompasses human users and programmatic users, e.g., automation programs; while, an "administrator", herein, is a user with expertise regarding the inter-platform application manager not, in general, shared by other users. In the present case, a non-administrator user could obtain a list of platform-specific resources, and select one of the resources for deployment. However, the deployment would fail if the requested resource had not been mapped, e.g., to a proxy. Of course, a programmatic user could create a program to effect the desired mapping, but, in general, it is not good practice to force an automation programmer to be concerned with the internal state (e.g., whether or not a resource has been mapped) of an endpoint, e.g., the inter-platform application manager.

Accordingly, the present invention enhances the accessibility of an inter-platform application manager by providing a stateless deployment front-end that automates the mapping of a proxy to platform resources. In an automatic mode, in response to a user request for a list of platform resources, the front-end automatically maps (many-to-one) platform resources to a proxy. In a manual mode, the front end allows an administrator to specify which platform resources are mapped to the proxy. In either mode, only platform resources that have been mapped are returned to the user. Thus, when the user selects a returned platform resource for deployment, the resource will be deployed without interruption due to a lack of mapping. The human or programmatic user is thus shielded from both the task and the existence of mapping. The programmatic user is provided a RESTful API (Representational State Transfer Application Programming Interface, a stateless, client-server, cacheable communications protocol), that the inter-platform application manager otherwise lacks.

As shown in FIG. 1, a multi-platform system 100 includes a first cloud services platform 102 (e.g., Amazon Web Services or "AWS"), a second cloud services platform 104 (e.g., Microsoft Azure) and an on-premises platform 106 (e.g., VMware's vCenter). A customer application 108 is distributed among platforms 102, 104, and 106. In alternative embodiments, a customer application may be distributed among two or more cloud services, two or more accounts from the same cloud service, two or more on-premises platforms, or any number of cloud accounts and any number of on-premises platforms.

Customer application 108, which may include several software applications, includes virtual machines 111 and 112 hosted in customer space 113 on cloud services platform 102, virtual machines 114 and 115 hosted in customer space 116 on cloud-services platform 104, and virtual machines 117 and 118 hosted in customer space 119 on on-premises platform 106. In general, any platform can host any number of applications, virtual machines, virtual storage units, and virtual network devices, etc.

An inter-platform manager 120 includes a management model 122 that corresponds to distributed customer application 108. Management model 122 includes proxies for resources of application 108 even as they are distributed among platforms 102, 104, and 106. For example, management model 142 includes proxies 131, 132, 134, 135, 137, and 138, which respectively correspond to virtual machines 111, 112, 114, 115, 117, and 118 of distributed customer application 108. Inter-platform manager 120 includes a database 140 that includes records specifying the mappings 142 of virtual-machine proxies to virtual machines, along with the specifications of the virtual machines.

Database 140 and model 122 can be populated using a discovery module 144, that queries platforms 102, 104, and 106, regarding active customer resources. Accordingly, if a resource is added to a customer space 102, discovery module 148 can be used to detect the addition and cause it to be represented in database 140 and by a new resource proxy in model 122. Inter-platform application manager 120 also includes a communication monitor 146 that can be used to characterize intra-platform and inter-platform communications patterns among modeled compute resources.

One limitation of inter-platform application manager 120 is that external automation software would have to communicate with it over a non-RESTful API 149, as the state of inter-platform 120 depends on the contents of relational database 140 in general, and whether or not resource templates have been mapped and to what proxy.

Advantageously, however, a new resource can be added using stateless deployment front-end 150. A user can select a resource proxy template 152, e.g., a blueprint. In general, the user may be given an opportunity to customize the template, e.g., by specifying a number of processors for a virtual machine. An auto-mapper 154 can then query the platforms 102, 104, and 106 for platform-specific templates 162, 164, and 166 that may be compatible with the specified resource proxy. In an automatic mode, auto-mapper 154 causes manager 120 to map each returned platform resource template to the proxy; in a manual mode, the auto-mapper allows an administrator to specify the platform resource templates to be mapped to the proxy. In the illustrated embodiment, a single mapping associates the proxy one-to-many with the resource templates in relational database 140; in an alternative embodiment, plural 1:1 mappings can be used.

Once platform resource templates have been mapped, they can be presented in a list 155 of resource s that have been pre-mapped. The user may select a resource template from list 155 for deployment. Deployment may be initiated by activating deployment trigger 156, which interfaces with deployment manager 144 of the inter-platform application manager 120, which interfaces with platform deployment engines to effect deployment of the platform resource without risk of an interruption for lack of a mapping. In some embodiments, upon deployment of a selected resource template, mappings of the proxy to unselected resources can be deleted.

In some embodiments, an administrator can create mapping rules 158 to filter the platform-resource templates returned by auto-mapper 154 in automatic mode. Such filtering can reduce the burden on a user seeking to deploy a new virtual machine and also reduce the chances for non-optimal selections. In some cases, the rules may be designed to return only a single platform-specific template. In such cases, the user can be shielded from the platform-specific templates and the automatically selected platform-specific template can be deployed automatically without further engagement by the user. In other words, in some cases, the invention can thoroughly shield the user from the underlying platforms. However, especially for programmatic users, the filtering can be performed, if desired, by the external automation software via a RESTful API 159.

Figure 2:
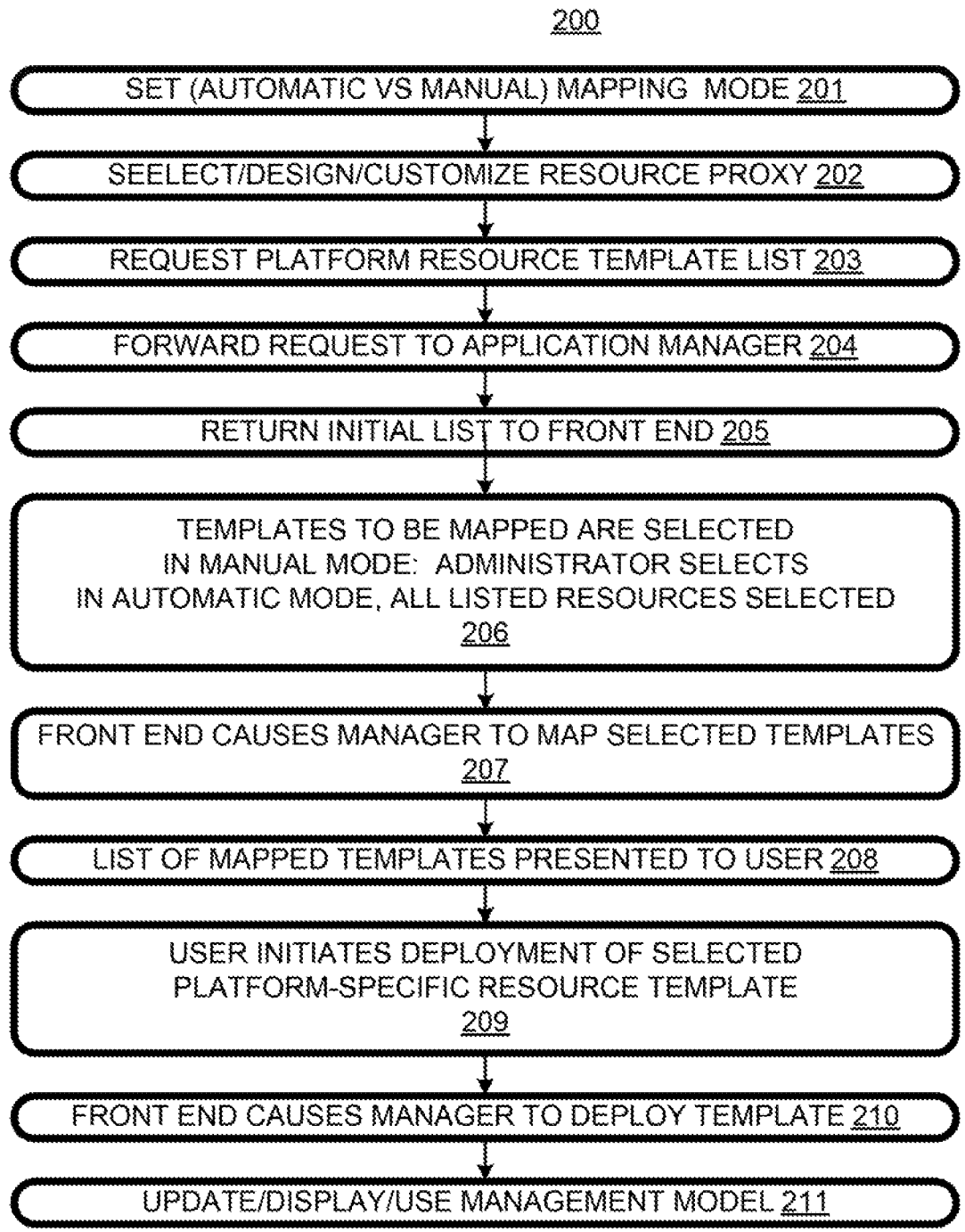
FIG. 2 is a flow chart of a resource-deployment process for an inter-platform application system.

A resource deployment process for an inter-platform application manager is flow charted in FIG. 2. At 201, a selection is made between an automatic mode of operation and a manual mode of operation. In automatic mode, all returned resource templates are mapped to a proxy, while in manual mode, an administrator intervenes to specify which templates are to be mapped to a proxy.

At 202, a user can select and/or design a resource proxy. Herein, "resource" can include applications, virtual machines, storage, and networking capabilities. Herein, a "resource proxy" is a representation at a management level of a physical or virtual resource executing on a cloud or on-premises platform. Herein, a "virtual" resource is a real resource in the form of a software emulation of a hardware resource, e.g., machine, storage unit, or network device. A resource proxy may be selected by selecting and, possibly, customizing a resource-proxy template.

At 203, a user requests a platform resource template list. The request may specify a platform the resource templates of which are to be returned. In some embodiments, the request is not acted on if no platform is specified in the request. In other embodiments, resource templates from all platforms are returned if no platform is specified. The user many be human or programmatic, so the request may be made over a RESTful API or a visual interface of the front end.

At 204, the request is forwarded from the front-end to the inter-platform application manager. At 205, the inter-platform application manager returns an initial list of one or more resource templates. At 206, in manual mode only, an administrator selects the resource templates from the initial list that are to be presented to the user. At 207, the front end accesses the application manager and causes it to map the proxy to the selected resource templates.

At 208, a list of mapped templates is presented to the user. The user need not be aware of the mappings, only of the listed templates. At 209, the user selects and initiates deployment of a listed (mapped) template. At 210, the front end causes the manager to deploy the selected template; since the template has been mapped, there is no risk of interruption due to a lack of a mapping. At 211, the management model can be updated with the proxy, which now corresponds to a deployed resource. Mappings to unselected mapped resources may be removed.

Some embodiments employ a variety of filtering techniques to limit the selection of resource templates that can be selected for deployment. For example, user permissions may restrict a user form using certain platforms and/or certain templates provided by a platform. A blueprint for a proxy may include specifications that cannot be met by some templates, while other templates might have excess capacity for which the enterprise would not want to pay. Likewise, specifications added by a user, e.g. for the size (aka "flavor") of a proxy might be used to constrain the list of selectable resources. Filters can also take into account, the remaining capacity of a limited-capacity cloud account that is already hosting applications. Further filters may take current pricing structures into account to minimize costs. Some of these filters may be built into the front end, some may be built into the application manager, and some may be configured in the front end by an administrator.

Administrator-configured filters are particular useful for limiting the choices of human users to exclude resource templates that are incompatible with a proxy or non-optimal for the proxy. In some embodiments, the filters return only a single template, which can be automatically deployed without further input to the user.

Process 200 can be executed once to deploy a resource on one platform, and a second time to deploy a resource on a second distinct platform. By extension, it can be seen that multiple instances of process 200 can be run, sequentially, in a pipelined fashion, or in parallel to deploy components of a distributed application on respective platforms of a multi-platform application hosting environment. A blueprint for a distributed application can include sub-blueprints, each of which can be deployed to implement a respective distributed application component on a respective platform of a multi-platform application hosting environment. Some embodiments include an auto-mapper that maps a first proxy component to templates in one platform and a second proxy component and any succeeding proxy components to respective sets of templates from respective platforms. Other embodiments use other approaches to inter-platform deployments.

By "deploying" is meant putting into service, e.g., by installing a resource image on a platform, so as to add a compute resource to and transform the functionality of a computing platform, such as a cloud service or an on-premises system.

All art labeled "prior art", if any, is admitted prior art. All art not labelled "prior art" if any, is not admitted prior art. The illustrated embodiments, variations thereupon, and modifications thereto are provided for by the present invention, the scope of which is defined by the following claims.

What is claimed is:

1. A computing-resource deployment process comprising:
    receiving a specification set including a first specification for a first resource proxy;
    causing an inter-platform application manager to automatically map the first resource proxy to each platform resource template of a set of one or more platform resource templates, each platform resource template being associated with a respective platform managed via the inter-platform application manager;
    returning to the user a list set of at least a first resource-template list of one or more resource templates that have been mapped to the first resource proxy;
    receiving from the user a selection set, the selection set including a first selection of a first platform resource template from the first resource-template list; and
    causing the inter-platform application manager to deploy a resource-template set, the resource template set including the selected first resource template, the first resource template being deployed on the first platform.

2. The process of claim 1 further comprising excluding for each list of the list set resource templates that have not been mapped.

3. The process of claim 1 wherein the specification set and the selection set are received from a programmatic user via a RESTful API, the list set being returned over a non-RESTful API.

4. The process of claim 1 wherein the platforms managed by the inter-platform application manager include cloud services accounts.

5. The process of claim 1 wherein:
    the specification set includes a second specification, the second specification being for a second resource proxy:
    the causing includes causing the inter-platform application manager to automatically map platform resources from the first platform to the first resource proxy and to automatically map platform resources from a second platform to the second resource proxy, the second platform being separate from the first platform;
    the list set includes a second resource-template list of one or more resource templates that have been mapped to the second resource proxy;
    the selection set includes a second selection of a second platform resource template from the second resource-template list; and
    the resource template set includes the second resource template which is deployed on the second platform.

6. The process of claim 5 wherein the first and second resource proxies are defined by respective and separate sub-blueprints of a distributed application blueprint for an application that is to be distributed among plural platforms.

7. A computing-resource deployment system comprising non-transitory media encoded with code that when executed by a processor implements a process including:
    receiving a specification set including a first specification for a first resource proxy;
    causing an inter-platform application manager to automatically map the first resource proxy to each platform resource template of a set of one or more platform resource templates, each platform resource template being associated with a respective platform managed via the inter-platform application manager;
    returning to the user a list set of at least a first resource-template list of one or more resource templates that have been mapped to the first resource proxy;
    receiving from the user a selection set, the selection set including a first selection of a first platform resource template from the first resource-template list; and
    causing the inter-platform application manager to deploy a resource-template set, the resource template set including the selected first resource template, the first resource template being deployed on the first platform.

8. The system of claim 7 wherein the process further excludes for each list of the list set resource templates that have not been mapped.

9. The system of claim 7 wherein the specification set and the selection set are received from a programmatic user via a RESTful API, the list set being returned over a non-RESTful API.

10. The system of claim 7 wherein the platforms managed by the inter-platform application manager include cloud services accounts.

11. The system of claim 7 wherein:
    the specification set includes a second specification, the second specification being for a second resource proxy:
    the causing includes causing the inter-platform application manager to automatically map platform resources from the first platform to the first resource proxy and to automatically map platform resources from a second platform to the second resource proxy, the second platform being separate from the first platform;
    the list set includes a second resource-template list of one or more resource templates that have been mapped to the second resource proxy;
    the selection set includes a second selection of a second platform resource template from the second resource-template list; and
    the resource template set includes the second resource template which is deployed on the second platform.

12. The system of claim 11 wherein the first and second resource proxies are defined by respective and separate sub-blueprints of a distributed application blueprint for an application that is to be distributed among plural platforms.

13. The system of claim 7 further comprising the processor.

* * * * *